United States Patent
Lalam

(10) Patent No.: US 9,623,509 B2
(45) Date of Patent: Apr. 18, 2017

(54) METHOD OF WELDING NICKEL-ALUMINIDE

(75) Inventor: Sree Harsha Lalam, Munster, IN (US)

(73) Assignee: ArcelorMittal, Luxembourg (LU)

( * ) Notice: Subject to any disclaimer, the term of this patent is extended or adjusted under 35 U.S.C. 154(b) by 835 days.

(21) Appl. No.: 13/346,922

(22) Filed: Jan. 10, 2012

(65) Prior Publication Data

US 2012/0175355 A1 Jul. 12, 2012

Related U.S. Application Data

(60) Provisional application No. 61/460,829, filed on Jan. 10, 2011.

(51) Int. Cl.
| | | |
|---|---|---|
| *B23K 9/00* | (2006.01) | |
| *B23K 9/23* | (2006.01) | |
| *B23K 9/167* | (2006.01) | |
| *B23K 33/00* | (2006.01) | |
| *B23K 103/08* | (2006.01) | |
| *B23K 103/10* | (2006.01) | |
| *B23K 103/00* | (2006.01) | |
| *B23K 103/18* | (2006.01) | |

(52) U.S. Cl.
CPC .............. *B23K 9/23* (2013.01); *B23K 9/167* (2013.01); *B23K 33/004* (2013.01); *B23K 2203/08* (2013.01); *B23K 2203/10* (2013.01); *B23K 2203/26* (2015.10); *B23K 2203/52* (2015.10)

(58) Field of Classification Search
CPC .. B23K 35/3086; B23K 35/3073; B23K 9/00; B23K 9/095; B23K 35/3066; B23K 9/0213; B23K 9/23; B23K 33/004; B23K 9/167; B23K 2203/08; B23K 2203/10; B23K 2203/52; B23K 2203/26
USPC .......... 219/60 R–60 A, 76.14–76.17, 121.11, 219/128, 146.23, 146.41
See application file for complete search history.

(56) References Cited

U.S. PATENT DOCUMENTS 1,531,824 A * 3/1925 Smith ............................. 219/61
1,872,114 A * 8/1932 Burnish ...................... 219/60 R
(Continued)

FOREIGN PATENT DOCUMENTS

WO 9915305 A1 4/1999

*Primary Examiner* — Eric Stapleton
(74) *Attorney, Agent, or Firm* — Davidson, Davidson & Kappel, LLC

(57) ABSTRACT

A method for gas tungsten arc welding (GTAW) of nickel-aluminide is provided. The method includes machining a weld groove having a width from 1 to 2 mm on an outer surface, a weld groove angle with a vertical being less than 30°; and a root face being not longer than 3 mm. During welding, a measured temperature 30 cm (12") from a weld torch and 3 mm from the weld groove edge should not exceed 200° C.; and an interpass temperature should be less than 85° C. measured at 3 mm from the weld groove edge. With exception of the root pass, all filler and cap pass layering should start from the nickel-aluminide edge, each bead should be peened; and the weld cap pass should overlap on the nickel-aluminide surface edge by at least 3 mm. The weld bead layout at the nickel-aluminide edge should be laid at torch angle less than 30°, and the weld heat input should be in the range of 17 to 23 kJ/in. The linear welding speed is greater than 8.6 cm/min and a deposition rate should be greater than 3.0 cm³/min.

13 Claims, 2 Drawing Sheets

(56) References Cited

U.S. PATENT DOCUMENTS

| | | | |
|---|---|---|---|
| 2,050,326 A * | 8/1936 | Hopkins | 228/170 |
| 2,191,469 A * | 2/1940 | Hopkins | 427/580 |
| 2,191,482 A * | 2/1940 | Hopkins | 164/496 |
| 2,249,629 A * | 7/1941 | Hopkins | 428/683 |
| 2,350,716 A * | 6/1944 | Bissout et al. | 228/44.3 |
| 2,437,782 A * | 3/1948 | Hopkins | 164/496 |
| 2,490,024 A * | 12/1949 | Bernard | 219/124.5 |
| 2,525,133 A * | 10/1950 | Hopkins | 164/496 |
| 2,747,065 A * | 5/1956 | Diehl | 219/74 |
| 2,792,490 A * | 5/1957 | Risch et al. | 219/137 R |
| 2,815,436 A * | 12/1957 | Bland | 219/74 |
| 2,881,579 A * | 4/1959 | Aasland | 56/104 |
| 2,910,572 A * | 10/1959 | Diehl | 219/60 R |
| 2,916,600 A * | 12/1959 | Tichler | 219/74 |
| 2,927,990 A * | 3/1960 | Johnson | 219/73 |
| 2,963,129 A | 12/1960 | Eberle | |
| 2,982,018 A * | 5/1961 | Neely | 228/165 |
| 3,001,497 A * | 9/1961 | Thielsch | 228/56.3 |
| 3,002,191 A * | 9/1961 | Thielsch | 228/168 |
| 3,022,413 A * | 2/1962 | Johnson | 219/73 |
| 3,044,767 A * | 7/1962 | Winkler et al. | 271/2 |
| 3,073,948 A * | 1/1963 | Johnson | 219/137 R |
| 3,078,363 A * | 2/1963 | Johnson | 219/146.41 |
| 3,118,047 A * | 1/1964 | Johnson | 219/76.12 |
| 3,126,471 A * | 3/1964 | Nelson | 219/60 A |
| 3,184,577 A * | 5/1965 | Witherell | 219/137 R |
| 3,209,118 A * | 9/1965 | Dyer et al. | 219/60 A |
| 3,266,701 A * | 8/1966 | Peignen | 228/27 |
| 3,288,982 A * | 11/1966 | Suzuki et al. | 219/137 R |
| 3,307,014 A * | 2/1967 | Bada et al. | 219/137 R |
| 3,351,734 A * | 11/1967 | Arikawa et al. | 219/137 R |
| 3,437,787 A * | 4/1969 | Chyle | 219/137 R |
| 3,522,412 A * | 8/1970 | Ferguson et al. | 219/137 R |
| 3,610,876 A * | 10/1971 | Bhat | 219/137 R |
| 3,674,544 A * | 7/1972 | Grosseau | 27/451 |
| 3,679,866 A * | 7/1972 | Arikawa et al. | 219/137 R |
| 3,743,008 A * | 7/1973 | Zeek et al. | 165/9 |
| 3,748,429 A * | 7/1973 | Agusa et al. | 219/73 |
| 3,777,114 A * | 12/1973 | Reynolds | 219/160 |
| 3,825,712 A * | 7/1974 | Gibbs | 219/137 R |
| 3,999,036 A * | 12/1976 | Muratov et al. | 219/145.22 |
| 4,010,309 A * | 3/1977 | Petersen | 428/386 |
| 4,019,018 A * | 4/1977 | Oishi et al. | 219/137 R |
| 4,038,514 A * | 7/1977 | Ashton | 219/126 |
| 4,095,077 A | 6/1978 | Schneider et al. | |
| 4,095,085 A * | 6/1978 | Tomita et al. | 219/123 |
| 4,136,273 A * | 1/1979 | Eujita et al. | 219/121.36 |
| 4,149,063 A * | 4/1979 | Bishel | 219/146.23 |
| 4,196,335 A * | 4/1980 | Ikeda et al. | 219/73 |
| 4,213,025 A * | 7/1980 | Kuhnen | 219/73.2 |
| 4,219,717 A * | 8/1980 | Kuhnen | 219/61 |
| 4,230,255 A * | 10/1980 | Coulter | 228/184 |
| 4,233,490 A * | 11/1980 | Shalai et al. | 219/121.36 |
| 4,292,496 A * | 9/1981 | Hoy et al. | 219/126 |
| 4,320,277 A * | 3/1982 | Taira et al. | 219/61 |
| 4,440,339 A * | 4/1984 | Tamai et al. | 228/119 |
| 4,481,402 A * | 11/1984 | Hoy et al. | 219/137 R |
| 4,514,614 A * | 4/1985 | Stol | 219/125.11 |
| 4,562,327 A * | 12/1985 | Mielke | 219/76.11 |
| 4,577,084 A * | 3/1986 | Stol | 219/85.22 |
| 4,627,213 A * | 12/1986 | Magnin | 52/745.02 |
| 4,633,554 A * | 1/1987 | Clark et al. | 29/888 |
| 4,661,682 A * | 4/1987 | Gruner et al. | 219/121.47 |
| 4,721,837 A * | 1/1988 | Gamberg | 219/69.1 |
| 4,745,256 A | 5/1988 | Shubert | |
| 5,006,308 A * | 4/1991 | Liu et al. | 420/445 |
| 5,093,148 A * | 3/1992 | Christodoulou et al. | 427/580 |
| 5,106,010 A * | 4/1992 | Stueber et al. | 228/232 |
| 5,108,700 A * | 4/1992 | Liu | 420/445 |
| 5,201,161 A * | 4/1993 | Kamei | 52/745.02 |
| 5,258,600 A | 11/1993 | Arthur | |
| 5,305,946 A | 4/1994 | Heilmann | |
| 5,347,098 A * | 9/1994 | Murakami et al. | 219/61 |
| 5,413,876 A * | 5/1995 | Santella et al. | 428/680 |
| 5,530,219 A * | 6/1996 | Offer et al. | 219/137 R |
| 5,545,373 A * | 8/1996 | Maziasz et al. | 420/81 |
| 5,591,363 A * | 1/1997 | Amos et al. | 219/137 PS |
| 5,628,449 A * | 5/1997 | Onuma et al. | 228/262.41 |
| 5,711,343 A * | 1/1998 | Beckett | 137/512.1 |
| 5,725,693 A * | 3/1998 | Santella et al. | 148/428 |
| 5,760,365 A * | 6/1998 | Milewski et al. | 219/121.64 |
| 5,820,939 A * | 10/1998 | Popoola et al. | 427/449 |
| 5,833,455 A * | 11/1998 | Carr | 432/246 |
| 5,898,994 A | 5/1999 | Miller et al. | |
| 5,914,055 A * | 6/1999 | Roberts et al. | 219/76.15 |
| 5,958,521 A * | 9/1999 | Zaluzec et al. | 427/449 |
| 6,001,426 A * | 12/1999 | Witherspoon et al. | 427/449 |
| 6,040,545 A * | 3/2000 | Taki et al. | 219/75 |
| 6,080,960 A * | 6/2000 | Fournier et al. | 219/137 WM |
| 6,111,218 A * | 8/2000 | Matile et al. | 219/137 PS |
| 6,146,696 A * | 11/2000 | Das et al. | 427/253 |
| 6,149,051 A * | 11/2000 | Vollmer et al. | 228/262.72 |
| 6,177,046 B1 | 1/2001 | Simkovich et al. | |
| 6,307,178 B1 | 10/2001 | Gierull | |
| 6,386,427 B2 * | 5/2002 | Iwago et al. | 228/164 |
| 6,397,651 B2 * | 6/2002 | Usui et al. | 72/294 |
| 6,429,402 B1 * | 8/2002 | Dixon et al. | 219/121.63 |
| 6,450,392 B1 * | 9/2002 | Nakamura et al. | 228/104 |
| 6,475,647 B1 * | 11/2002 | Mendez Acevedo et al. | 428/678 |
| 6,544,668 B1 | 4/2003 | Santella et al. | |
| 6,589,671 B1 * | 7/2003 | Kehrer | 428/683 |
| 6,600,126 B2 * | 7/2003 | Steinhoff et al. | 219/76.14 |
| 6,816,671 B1 * | 11/2004 | Reddy et al. | 392/485 |
| 6,828,526 B1 * | 12/2004 | Stol et al. | 219/137 R |
| 7,172,820 B2 * | 2/2007 | Darolia et al. | 428/621 |
| 7,205,032 B2 * | 4/2007 | Branagan | 427/446 |
| 7,341,176 B2 * | 3/2008 | Lundstrom et al. | 228/138 |
| 7,441,688 B2 * | 10/2008 | Van Heerden et al. | 228/102 |
| 8,153,935 B2 * | 4/2012 | Jang et al. | 219/145.22 |
| 8,217,295 B2 * | 7/2012 | Bruckner et al. | 219/61 |
| 8,681,923 B2 * | 3/2014 | Ashida et al. | 376/287 |
| 2003/0000931 A1 * | 1/2003 | Ueda et al. | 219/124.02 |
| 2004/0134898 A1 | 7/2004 | Bjorkman et al. | |
| 2004/0209110 A1 * | 10/2004 | Pfaendtner et al. | 428/627 |
| 2005/0011933 A1 | 1/2005 | Grong | |
| 2005/0067065 A1 * | 3/2005 | Fernihough et al. | 148/512 |
| 2005/0069650 A1 * | 3/2005 | Darolia et al. | 427/446 |
| 2006/0201915 A1 * | 9/2006 | Obana et al. | 219/76.1 |
| 2007/0164088 A1 * | 7/2007 | Dianatkhah | 228/183 |
| 2008/0000881 A1 * | 1/2008 | Storm et al. | 219/121.47 |
| 2008/0011813 A1 * | 1/2008 | Bucci et al. | 228/119 |
| 2008/0110962 A1 * | 5/2008 | Saxena et al. | 228/123.1 |
| 2008/0138529 A1 * | 6/2008 | Weaver et al. | 427/456 |
| 2008/0237195 A1 * | 10/2008 | Iwasa et al. | 219/61 |
| 2009/0123290 A1 * | 5/2009 | Imano et al. | 416/241 R |
| 2009/0130478 A1 * | 5/2009 | Douin et al. | 428/615 |
| 2009/0252613 A1 | 10/2009 | Gorman et al. | |
| 2009/0321405 A1 * | 12/2009 | Baker et al. | 219/146.23 |
| 2010/0032472 A1 * | 2/2010 | Heinecke et al. | 228/227 |
| 2010/0062151 A1 * | 3/2010 | Tuppen et al. | 427/140 |
| 2010/0129256 A1 | 5/2010 | Nazmy et al. | |
| 2010/0147047 A1 | 6/2010 | Kerdiles et al. | |
| 2010/0183112 A1 * | 7/2010 | Ashida et al. | 376/287 |
| 2010/0237134 A1 * | 9/2010 | Bucci et al. | 228/119 |
| 2011/0079631 A1 * | 4/2011 | Baker | 228/121 |
| 2011/0287191 A1 * | 11/2011 | Martin et al. | 427/554 |
| 2011/0315668 A1 * | 12/2011 | Olsen | 219/146.23 |

* cited by examiner

METHOD OF WELDING NICKEL-ALUMINIDE

CROSS-REFERENCE TO RELATED APPLICATIONS

This Application claims the benefit under 35 U.S.C. 119(e) of U.S. Provisional Application No. 61/460,829 filed Jan. 10, 2010.

FIELD OF THE INVENTION

The present invention relates to methods for welding of nickel-aluminide to itself and other nickel-based alloys. More specifically the method relates to Gas Tungsten Arc Welding (GTAW) of low zirconium or zirconium free nickel-aluminide. Most specifically the method relates to the Gas Tungsten Arc Welding (GTAW) of low zirconium or zirconium free nickel-aluminide furnace rolls using commercially available filler material.

BACKGROUND OF THE INVENTION

Nickel-aluminide (NbAl) is an ordered intermetallic compound having unique properties. The strength of nickel-aluminide increases with temperature and it is stable over a wide range of chemical composition. The tendency of Ni-Aluminide for long range ordering restricts atomic mobility in an alloy. It is therefore resistant to diffusion controlled process which helps retain high temperature strength for a long time. In addition to stable high temperature strength, nickel-aluminide forms adherent aluminum oxide scale which enhances its resistance to high temperature oxidation and corrosion. All these salient features have promoted nickel-aluminide as a viable candidate for high temperature furnace application. While single crystal nickel-aluminide has excellent high temperature properties, the poly crystalline material has grain boundary ductility at high temperature, which makes it brittle during manufacturing of an engineered component due to generation of cracks along grain boundaries.

Early in 2000, Oak Ridge National Laboratories (ORNL) conducted extensive research in which it developed a cast Ni-Aluminide composition for industrial applications and patented the alloy design. The first industrial application chosen was high temperature furnace roll. A typical a furnace roll has two main components: 1) a cylindrical sleeve (hollow or solid) and 2) bells (bell shaped domes joined at either end of the sleeve). The bell and sleeve can be of similar material or different. During service the sleeve will endure more service load and be exposed to higher temperatures than the bells. Therefore to save cost, the bells can be made of lower grade material. ORNL selected More-1 as the alloy for the bells and nickel-aluminide as the sleeve material. During the fabrication process ORNL discovered that the developed nickel-aluminide had a tendency to generate cracking in the heat affected zone (HAZ) of the welds. To mitigate cracking 1.8% Zr was added to original nickel-aluminide composition. At the same time, to avoid cracking due to dilution a matching filler alloy was invented (IC221 LA filler wire or rod), Thus ORNL designed and developed a cast nickel-aluminide composition and filler wire for furnace roll application. These prior art rolls were implemented at the ArcelorMittal Burns Harbor quench and temper (Q&T) furnace.

In 2005, it was found that the installed rolls internally oxidized and developed nickel oxide protrusions on the roll surfaces. These nickel oxide protrusions have been causing surface defects during rolling of furnace reheated steel. Research at ArcelorMittal Global Research found that Zirconium (Zr) causes grain boundary oxidation and promotes surface oxidation causing the protrusions. To avoid this internal oxidation and surface oxide protrusions a furnace roll chemical composition free from Zr was developed. However, the published literature has emphasized that the presence of Zr at grain boundaries is required to improve the weldability of the nickel-aluminide and that without Zr in the roll, grain boundary cracking might occur.

Thus, there is needed a viable welding procedure to join cast low-Zr or Zr-free nickel-aluminide to itself or other nickel-base material.

SUMMARY OF THE INVENTION

The present invention fulfills the need for a viable welding procedure to join cast low-Zr or Zr-free nickel-aluminide to itself or other nickel-base material. The method is characterized in that it includes the following sets of limitations:

I) a) the weld groove has 1-2 mm machining on the outer surface thereof, b) the weld groove angle with vertical is less than 30°; and the root face is not longer than 3 mm;

II) a) while welding, the measured temperature 30 cm (12") from the weld torch and 3 mm from groove edge should not exceed 200° C.; and the interpass temperature should be less than 85° C. measured at 3 mm from the weld grove edge;

III) a) with exception of the root pass, all filler and cap pass layering should start from the nickel-aluminide edge; b) each bead should be peened; and c) the weld cap pass should overlap on the nickel-aluminide surface edge by at least 3 mm;

IV) the weld bead layout at the nickel-aluminide edge should be laid at torch angle less than 30°;

V) the weld heat input should be in the range of 17-23 kJ/in; and

VI) a) the linear welding speed is greater than 8.6 cm/min; and b) deposition rate should be greater than 3.0 $cm^3$/min.

The nickel-aluminide may comprise, in weight %, Ni 70-85%, Al 6-10%, Cr 5-10%, Zr 0-8%, Mo 0-6%, B 0.0001-0.02%. The nickel-aluminide may comprise 0-1% Zr. Alternatively, the nickel-aluminide may comprise 0-0.15% Zr. In another embodiment, the nickel-aluminide may comprise 0% Zr. In a particularly useful embodiment, the nickel-aluminide may comprise, in weight %, C 0.05% max; S 0.005% max; Cr 7.7%; Mn 0.1% max; Si 0.1% max; Mo 3.0%; Al 7.8%; Zr 0.08-0.15%; B 0.008%; Cu 0.3% max; P 0.01% max; Ni Balance. The nickel-aluminide may be a furnace roll sleeve and the other nickel-based alloy may be a furnace roll bell.

The other nickel-based alloy may be More-1 which comprises, in weight percent, 0.55% C, 2.5% Si, 2.0% Mn, 28% Cr, 35% Ni, 1.4% W, and the remainder substantially Fe. Alternatively, the other nickel-based alloy may be Haynes 214 which comprises, in weight percent, 0.05% C, 0.2% Si, 0.5% max. Mn, 16% Cr, 0.1% max. Zr, 4.5% Al, 0.01% max B, and balance substantially Ni. The filler wire may be at least one alloy selected from:

a) Thermanit 25/35 R comprising, in weight %, C 0.42%, Si 1.0%, Nb 1.3%, Mn 1.8%, Cr 26%, Ni 35%, and the remainder substantially Fe;

b) RA330 comprising, in weight %, C 0.25%, Si 0.8%, Mn 5.2%, Cr 19%, Ni 35%, and the remainder substantially Fe; or c) RA602 CA comprising, in weight %, C 0.18%, Si 0.03%, Mn 0.05%, Cr 25%, Al 2.2%, Fe 10%, and the remainder substantially Ni.

The method may further include the step of preheating the filler wire to increase the deposition rate thereof. The maximum current for manual GTAW may be 105 A and for automatic GTAW may be 120 A. The maximum bead width per pass may be 9 mm. The may include the further steps of overlaying ductile filler wire over the edge of the nickel-aluminide material; and machining a weld groove into the overlaid filler wire. The method may also include the further steps of preheating the edge of the nickel-aluminide to 500° C.; and maintaining the nickel aluminide 3 mm from the edge at 500° C. during the GTAW process. The method may additionally include the further steps of: heating the nickel-aluminide to 900° C.; and soaking the nickel-aluminide at 900° C. for 1 hour per inch (25.4 mm) thickness thereof.

DETAILED DESCRIPTION OF THE INVENTION

Figure 1:
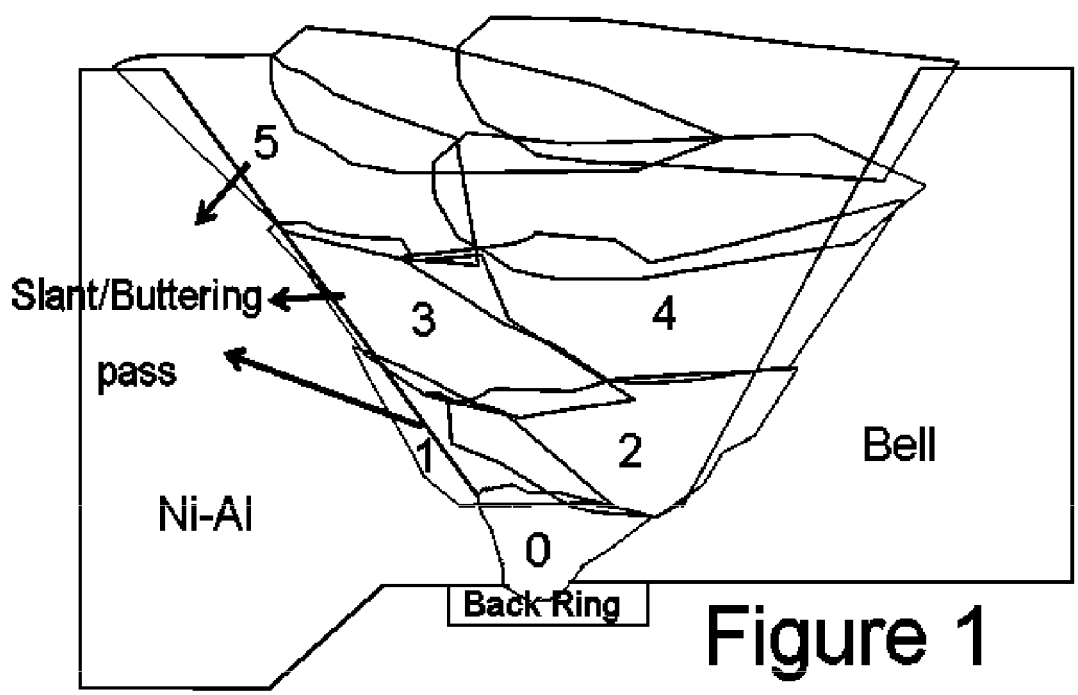
FIG. 1 shows the preferred bead overlay sequence for the GTAW method of the present invention.

Welding of nickel base materials is a challenging task to welders and welding engineers. Most of the nickel base materials will increase the strength of the matrix with raise in temperature by forming gamma and gamma prime precipitates. In high temperature nickel base alloys, which form nickel-aluminide precipitates the increase in strength decreases the hot ductility. The material can not withstand the cooling stresses generated during casting or welding. The low or zero ductility at grain boundary area will lead to grain boundary cracking in the heat affected zone (HAZ) where the temperatures reach up to melting point. During fabrication by welding process the components were mechanically restrained, based on material coefficient of expansion the restraint generate stresses during cooling. The generated weld stresses cannot be completely eliminated, but can be reduced.

As used herein, the typical chemical composition range of nickel-aluminide alloys used for furnace roll sleeves is shown in Table A, other elements like Hf, Re, Ti, Nb, etc. can be present.

TABLE A

| Element | Weight Min. % | Max. % |
| --- | --- | --- |
| Ni | 70 | 85 |
| Al | 6 | 10 |
| Cr | 5 | 10 |
| Zr | 0 | 8 |
| Mo | 0 | 6 |
| B | 0.0001 | 0.02 |

As used herein, More-1 (a trademark of Duralloy Technologies Inc.) has a nominal alloy composition in weight percent of 0.55% C, 2.5% Si, 2.0% Mn, 28% Cr, 35% Ni, 1.4% W, and the remainder substantially Fe. Another alloy useful for forming bells of furnace rolls using the inventive welding technique of the present invention is Haynes 214 (a trademark of trade name of Haynes International), which has a nominal composition in weight percent of 0.05% C, 0.2% Si, 0.5% max. Mn, 16% Cr, 0.1% max. Zr, 4.5% Al, 0.01% max B, and balance substantially Ni. As used herein, the compositions of typical filler wires are given in Table B.

TABLE B

| Filler wire | C | Si | Nb | Mn | Cr | Ni | Zr | Al | B | Fe |
| --- | --- | --- | --- | --- | --- | --- | --- | --- | --- | --- |
| Thermanit 25/35 R | 0.42 | 1.0 | 1.3 | 1.8 | 26 | 35.0 | — | — | — | Bal. |
| RA330 | 0.25 | 0.8 | — | 5.2 | 19 | 35 | — | — | — | Bal. |
| RA602 CA | 0.18 | 0.03 | — | 0.05 | 25 | Bal. | — | 2.2 | — | 10 |

Thermanit 25/35 R is trademark of Bohler Thyssen.
RA330 and RA602 CA are trademarks of Rolled Alloys.

The GTAW method of the present invention has achieved success in welding Zr-free and low-Zr (<0.15 Zr) nickel-aluminide to itself and other nickel alloys. This success has been achieved through understanding of the cast nickel-aluminide microstructure, and by controlling: the welding process variables; the roll surface temperature during welding; the welding time per unit length; the weld joint design with respect to the cast nickel-aluminide sleeve grain structure; and the weld bead layout. The following is a list of the important features of the present welding technique:

I. The weld groove should have less machining on outer surface (1-2 mm) and the groove angle with vertical should be less than 30° with root face not exceeding 3 mm. To avoid internal diameter porosity in the weld groove, the ID can be machined.

II. While welding the measured temperature 30 cm (12") from the weld torch and 3 mm from groove edge should not exceed 200° C. The interpass temperature should be less than 85° C. measured at 3 mm from the weld groove edge.

III. With exception of root pass all filler and cap pass layering should start from nickel-aluminide edge and each bead should be peened. The weld cap pass should overlap on nickel-aluminide surface edge by 3 mm.

IV. The weld bead layout at the nickel-aluminide edge should be similar to buttering pass, laid at torch angle less than 30°.

V. Weld heat input should be in the range of 17-23 kJ/in.

VI. The linear welding speed should be greater than 8.6 cm/min. with approximate filler metal (25% Cr, 35% Ni) deposition rate should be greater than 3.0 $cm^3$/min. Higher depositions can be achieved by using preheated filler wire.

During arc welding, the electric arc supplies sufficient heat to melt the base material and any filler wire, if used. ORNL's prior art procedure includes using a U-groove and IC221 LA filler wire which is similar to the base material. Due to its high nickel content, IC221LA has relatively poor high temperature fluidity. To increase the fluidity additional heat is necessary. This heat must be supplied by either by the welding arc or by preheating the filler wire. To meet the high heat demand ORNL used 40-60 kJ/in weld heat input (without preheating the filler) to join a 1" thick 1.8% Zr nickel-aluminide sleeve with More-1 bells. The weld groove depth was approximately 13 mm and the total welding time was five hours with IC221 LA filler wire.

Higher weld heat inputs will further increase base material temperatures and corresponding cooling stresses, which might lead to cracking in HAZ. To avoid unnecessary stress increase in HAZ, monitoring HAZ temperature and close control of heat input was introduced as one step in the inventive technique to weld nickel-aluminide rolls. The optimum peak and interpass temperature were found by attaching four thermocouples to a cast 0% Zr nickel-aluminide sleeve. To avoid interference of arc the peak temperature was measured 150 cm from the arc source and all measurements were made within 3 mm from the edge of the weld joint. The welding was carried out by filling the U-groove with 2535R filler rod. The maximum interpass temperature and peak temperatures were 80° C. and 220° C., respectively. If temperatures are allowed to rise much above these optimum values and cracking will occur. To achieve lower temperatures the welding heat input was lowered to 18.6 kJ/in and 2535R filler wire was used instead of IC221LA.

Increasing the welding current will increase the arc penetration into the base material. This higher penetration will lead to higher dilution as well as increased stresses in the HAZ. As weld heat input is directly proportional to product of current and voltage, to control the penetration, controlling current is also essential along with heat input. Welding trials indicated that the optimum current range for the lower heat input GTAW process of the present invention is 80-110 A. Using these parameters provided welds and buttering layers that were crack free when welding a 0% Zr nickel-aluminide sleeve.

Another aspect of the GTAW technique of the present invention relates to weld bead sequencing and simulating overlay deposition on the nickel-aluminide edge. (Overlay deposition, also known as buttering, is discussed herein below.) Since improved weldability can be achieved by depositing ductile filler wire over the nickel-aluminide edge (see buttering below), the current bead layout to some degree simulates the overlay procedure. FIG. 1 shows the bead overlay sequence, after the root pass 0, the first filler pass 1 started from Ni-Aluminide edge and at an angle (less than 30° torch angle) and then the remainder of this layer was filled in with another pass 2 in a flat position. After completing one layer of bead deposition the next layer begins with the third pass 3 on nickel-aluminide edge, again at an angle. The $4^{th}$ pass 4, fills in the second layer, again flat. This procedure continues with the next pass 5 being against the nickel-aluminide at an angle and one or more additional passes to fill out each layer until the cap pass which overlaps onto the nickel-aluminide edge by about 3 mm to eliminate any stress concentration due to under cutting in the weld groove and sealing any micro porosity that might have existed. Two welds joining 0% Zr Ni-Aluminide sleeve with More-1 cast bell were made with above mentioned procedure at different currents. Trial welds made using GTAW with 100% Ar gas shielding and ⅛" non-consumable electrode, 0.045" diameter 2535 R filler wire for automatic, 3/32" 2535 R filler rod for manual welding process. In automatic GTAW process higher welding current (180 A) than manual welding (105 A) was used. The higher heat input welding resulted radial cracking but the lower heat input weld showed very good weld quality. The tensile strength of the joint made with higher heat input was 42-57 ksi and that of the lower heat input was 52-67 ksi. It should be noted that the strength of even the cracked weld made by higher heat input was much higher than the weld joint strength of the prior art and, while lower heat input produced welds that exhibited better quality and higher strength than the prior art. The radial cracking of the higher heat input weld is believed to be at the chilled and columnar zone interface.

Figure 2:
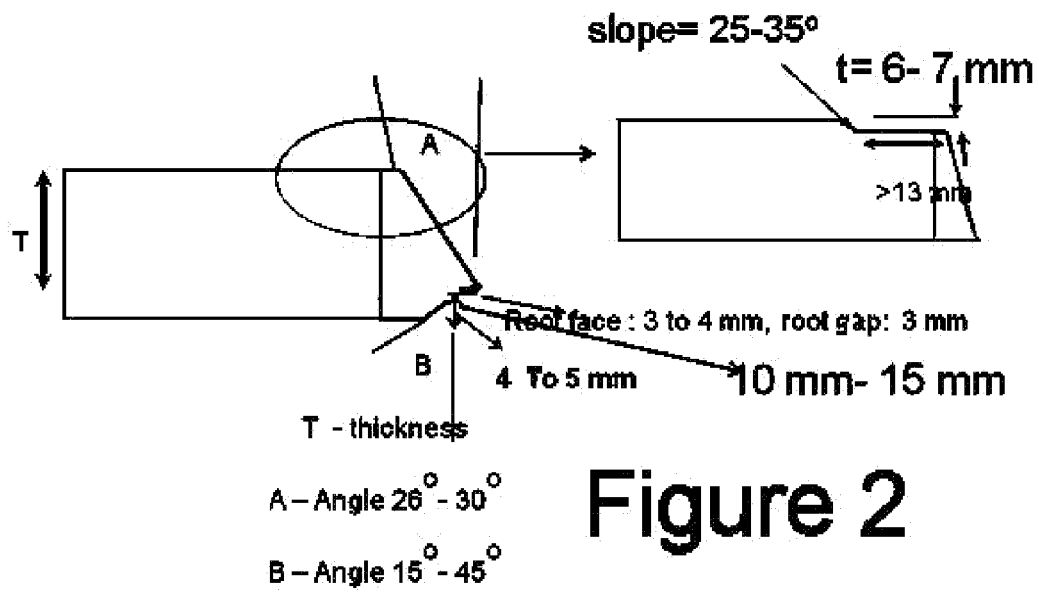
FIG. 2 depicts a weld joint design used to avoid radial cracking between the chilled zone and columnar grain zone interface of nickel-aluminide for use with the inventive GTAW method.

A new joint design was introduced to avoid radial cracking between the chilled zone and columnar grain zone interface, FIG. 2. The groove angle A was chosen between 26 to 30°, which reduces the amount of filler material required and, minimized total heat and stresses. Angle B is not an essential variable, but allows the backing to attach to the weld groove. The outer surface of the joint was machined to remove 6-7 mm (versus 3-4 mm in prior designs). The introduced change moved the whole weld groove down by machining more of the outer diameter and thereby eliminating the chilled zone. By avoiding the chilled zone in the HAZ, the amount grain boundary area is reduced, which leads to decreased radial cracking. Since solidification of the weld can introduce tensile stresses during cooling, peening on top of the freshly laid weld pass may be employed.

Example

Three 0% Zr production sleeves were cast and welded with More-1 bells. To ensure sufficient root accessibility and penetration root pass was welded manually using 3/32" diameter 2535 filler rod, 105 A welding current and all remaining filler passes were completed using parameters shown in Table 1.

TABLE 1

Automatic GTAW parameters for filler passes of example production roll.

| Welding parameters | Values |
| --- | --- |
| Current | 100/140 A (pulsing 50-50%) |
| Voltage | 9.6 V (approx.) |
| Pulse frequency | 1.8 |
| Pulse width | 50% |
| Excursion (weaving) | No |
| Out dwell time (weaving) | No |
| In dwell time (weaving) | No |
| Down slope | 20 |
| Wire speed | 60/5 ipm |
| Wire retract time | 1.5 sec |
| Filler wire | 2535 R |
| Filler wire size | 0.045" |
| Wire delay | 3.0 sec |
| Shielding gas | 100% Ar |
| Shielding gas flow rate | 25-30 CFM |
| Clean & Peen | Yes |
| Heat input | 20 kJ/in |
| Root gap | ⅛" (23 mm) |

The weld joints were subjected to DPE and radiography. The DPE results on root and cap passes showed no cracking and revealed small pores (<0.5 mm), but the radiograph revealed hair-line crack features along the transverse direction. However, overall the weld quality was better than the 1.8% Zr roll. After one month in service, to understand the crack propagation in the weld joints, another radiographic testing was carried out and the quality was compared. There was no visible change in crack length or features between as-welded and one month in service, which confirms the developed welding procedure works.

As discussed earlier nickel-aluminide rolls experience solidification stresses during the casting process and the high temperature ductility is required to withstand those, but the magnitude is less than welding. As an experiment the amount of zirconium of the prior art cast nickel-aluminide sleeves was lowered to 1.0% and the sleeves were welded with the prior art ORNL process and the present inventive welding procedure. The ORNL procedure produced extensive cracking and the inventive procedure exhibited good weldability and consistent weld strength. On the whole the inventive welding procedure and techniques result in good weld quality in joining nickel-aluminide irrespective of zirconium content.

The weldability of cast nickel-aluminide rolls depend on cast microstructure and amount of grain boundary constituents. One of the unfavorable alloying elements in nickel base alloys is sulphur, it diffuses to grain boundaries and forms low melting nickel compounds, which further decrease the high temperature ductility. To avoid such deleterious effects usually residual sulphur has to be combined with sulphide forming elements, such as zirconium, etc. So, choosing a nickel-aluminide alloy design using 0.1% Zr addition enhances the roll sleeves. See Table 2. The inventive procedure was used to join 0.1% Zr Ni-Aluminide sleeves with More-1 end bells. The weld quality was consistent and DPE results showed small porosity on machined outer surface. The joint strength was excellent and consistent.

TABLE 2

Low zirconium Ni-Aluminide sleeve alloy.

| Alloy | Avg. Wt % |
| --- | --- |
| C | 0.05 max. |
| S | 0.005 max. |
| Cr | 7.7 |
| Ni | Balance |
| Mn | 0.1 max |
| Si | 0.1 max. |
| Mo | 3.0 |
| Al | 7.8 |
| Zr | 0.08-0.15 |
| B | 0.008 |
| Cu | 0.3 max. |
| P | 0.01 max. |
| Fe | 0.3 max. |

Optimum Welding Procedure

Figure 3:
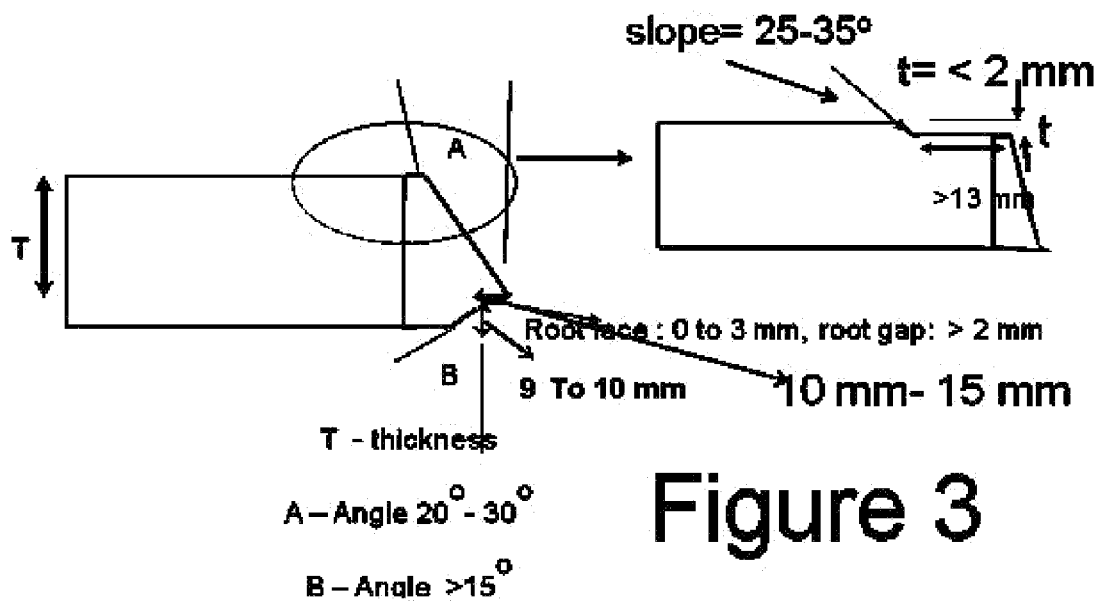
FIG. 3 depicts a final weld joint design for the optimized GTAW method of the present invention.

Finally, based on all the research findings, an optimized welding procedure was developed along with a highly productive weld joint, FIG. 3. The major change of the weld joint was to reduce the outer surface machining to less than 2 mm, sufficient to remove cast surface oxides.

The following are various steps involved in development of Ni-Aluminide weld joints;

I) Weld preparation:

Prepare the weld joint groove as shown in FIG. 3.

The weld joint should be free from oxides, machining oil and other contaminants.

Perform Dye Penetrant Examination (DPE) on machined groove of Ni—Al roll and take pictures and document any cracks present.

Grind any defects on OD or ID before welding.

Tack weld the backup ring to the bell (More-1) only.

II) Welding of root and filler passes:

Protect the weld joint from wind draft and other conditions which will prevent proper gas shielding of arc and weld pool.

In case of manual welding always start/initiate the arc at More-1 edge.

Weld the roll in flat position.

Use 2535R (25Cr-35Ni) 3/32" filler rod to tack weld the backup stainless ring to Ni—Al roll using 100-105 A current and 100-0% Argon and 0-100% He shielding gas.

For the root pass and all subsequent filler passes use "manuar" or automatic GTAW process.

Current: maximum 105 Amps for manual, 120 A for automatic GTAW process. Heat input in the range of 17-23 kJ/in.

Welding speed >8.6 cm/min.

Maximum 11/32" (9 mm) bead width.

Electrode size: 1/8" or 3/32"

Gas: 100-0% Argon and 0-100% He at 20-30 CFM. 75Ar-25He is preferred.

Filler wire: 3/32" or 0.045" diameter 2535R

Wire feed for automatic welding: 30/25 ipm.

Avoid bridging of weld metal during welding.

The weld sequence should be as shown in FIG. 1.

The interpass temperature should be less than 85° C., measured 3 mm from edge of the nickel-aluminide joint.

While welding, the measured temperature at 30 cm (12 inches) away from the arc source and 3 mm from the edge the temperature should not exceed 200° C.

III) Weld inspection:

In addition to visually examining each weld bead for cracks before laying the next bead, Dye Penetrant Evaluation (DPE) may be used on the first filler pass and the final cap weld.

Indications due to machining marks, casting conditions, surface oxides are not considered relevant.

IV) Weld repair:

Any relevant defects should be removed by grinding and welded using the root and filler pass weld procedures.

If any relevant indications are found in the cap pass grind 1.6 mm (1/16") and lay the cap pass keeping all welding parameters similar to previous filler passes.

New furnace rolls using the 0.1% Zr alloy of Table 2 were produced using the inventive welding technique of the present invention which includes optimized heat input, joint design and weld sequencing. The specific welding parameters are detailed in table 3. The radiograph and DPE quality of welds of as produced furnace rolls was outstanding.

Additional Techniques

In addition to the controlled heat input welding technique described above, the inventor has developed some added steps/criterion which can be used in conjunction with the inventive technique.

A first additional technique is to carefully overlaying ductile filler wire over the edge of the brittle nickel-aluminide material. Overlaying, is a technique of depositing, in flat position, a melted filler wire on top of another material with little melting of base metal. This process is also called buttering. Once the ductile filler wire is deposited, a weld groove is machined in the overlaid ductile material and the above controlled heat input inventive technique is used to attach the bell to the ductile filler weld groove.

The thickness of the deposited ductile filler wire layer should be a minimum of 3 mm after machining the weld groove. The presence of the minimum 3 mm ductile filler wire layer will reduce weld stresses in the less ductile base nickel-aluminide material. The overlay bead width should not exceed 7 mm and the interpass temperature should be kept below 80° C. Weld stresses can be further minimized by reducing weld filler wire additions by using a U or V-groove with decreased groove angle as discussed above. The overall low heat input welding technique combined with this overlaying (buttering), with subsequent welding in the ductile material will further improve nickel-aluminide weldability.

The cast nickel-aluminide sleeves for furnace rolls are 4 to 5 m long and to overlay or deposit the buttering pass on the edge of the roll in a flat position requires specialized handling equipment. To circumvent this problem, the inventors have employed a second additional technique, that of preheating the end of the sleeve to 500° C. During welding of a 0% Zr nickel-aluminide cast sleeve, it was preheated 3" away from the edge with the help of gas fired rose bud torches. The temperature was maintained at 500° C. at 3 mm from the edge and monitored with help of infrared thermometer. The selected cast nickel-aluminide base material had few defects. To understand the crack sensitivity, manual fillet weld passes using GTAW process and Ar shielding gas, were placed on the nickel-aluminide edge and backup ring. Ductile 25/35 R filler wire at 125 A was used to deposit a bead. It produced a good weld and no visible cracking in the weld bead. Thus, using 500° C. preheat and interpass temperature has helped in alleviating the crack propensity of the 0% Zr-nickel-aluminide sleeve.

Nickel-aluminide sleeves are made by pouring molten alloy in a rotating cylindrical mold. After pouring the molten metal is in contact with the cool mold, which chills the liquid melt at its surface, and depending on the temperature gradient and cooling rate, columnar grains will grow on top of the chilled grains. As a consequence of this chilling and cooling process, tensile residual stresses will develop in the cast structure, and the developed tensile stresses will increase the stresses generated during welding, thereby promoting cracking. To mitigate cracking in the weld, the stresses created during casting should be reduced. To this end the inventors have employed a third additional technique, heat soaking. A 1" (25.4 mm) thick 0% Zr Ni-Aluminide sleeve was heated to 900° C., soaked for 1 hr and air cooled to room temperature. Then successive weld beads were deposited and decreased cracking tendency was found. Thus heat treating cast nickel-aluminide sleeve will improve the weldability by decreasing stresses. The sleeve should be soaked 1 hr per 1 inch (25.4 mm) thickness of the sleeve.

It is to be understood that the disclosure set forth herein is presented in the form of detailed embodiments described for the purpose of making a full and complete disclosure of the present invention, and that such details are not to be interpreted as limiting the true scope of this invention as set forth and defined in the appended claims.

What is claimed is:

1. A method for gas tungsten arc welding (GTAW) of nickel-aluminide to itself or other nickel-based alloys using a filler wire, comprising the steps of:
    machining a weld groove having a width from 1 to 2 mm on an outer surface of the nickel-aluminide, an angle of the weld groove with a vertical being 30° or less and a root face being 3 mm or less;
    during welding, measuring a temperature 30 cm (12") from a weld torch and 3 mm from a weld groove edge, the temperature being 200° C. or less, and measuring an interpass temperature 3 mm from the weld groove edge, the interpass temperature being 85° C. or less;
    starting from a nickel-aluminide edge, layering all filler and cap pass, with the exception of a root pass, peening each bead, and overlapping the weld cap pass on the nickel-aluminide surface edge by at least 3 mm; and
    laying a weld bead layout at the nickel-aluminide edge at a torch angle of 30° or less, the weld heat input being from 17 to 23 kJ/in;
    a linear welding speed being 8.6 cm/min or more and a deposition rate being being 3.0 cm$^3$/min or more.

2. The method of claim 1, further comprising the step of:
    providing nickel-aluminide having a composition in weight %, including:
    $70 \leq Ni \leq to\ 85\%$,
    $6 \leq Al \leq 10\%$,
    $5 \leq Cr \leq 10\%$,
    $0 \leq Zr \leq 8\%$,
    $0 \leq Mo \leq 6\%$, and
    $0.0001 \leq B \leq 0.02\%$.

3. The method of claim 2, wherein said nickel-aluminide includes $0 \leq Zr \leq 1\%$.

4. The method of claim 3, wherein said nickel-aluminide comprises $0 \leq Zr \leq 0.15\%$.

5. The method of claim 4, wherein said nickel-aluminide comprises 0% Zr.

6. The method of claim 1, further comprising the step of:
    providing nickel-aluminide having a composition in weight %, including:
    $C \leq 0.05\%$;
    $S \leq 0.005\%$;
    $Cr=7.7\%$;
    $Mn \leq 0.1\%$;
    $Si \leq 0.1\%$;
    $Mo=3.0\%$;
    $Al=7.8\%$;
    $0.08 \leq Zr \leq 0.15\%$;
    $B=0.008\%$;
    $Cu \leq 0.3\%$;
    $P \leq 0.01\%$; and
    a balance of the composition consisting of Ni.

7. The method of claim 1, further comprising the step of:
    providing a nickel-aluminide furnace roll sleeve; and
    providing a nickel-based alloy furnace roll bell for welding to the nickel-aluminide furnace roll sleeve.

8. The method of claim 1, further comprising the step of preheating the filler wire to increase the deposition rate thereof.

9. The method of claim 1, wherein a maximum current for manual GTAW is 105 A and for automatic GTAW is 120 A.

10. The method of claim 1, wherein the maximum bead width per pass is 9 mm.

11. The method of claim 1, further comprising the steps of:
    overlaying ductile filler wire over the edge of the nickel-aluminide material; and
    machining a weld groove in the overlaid ductile filler wire.

12. The method of claim 1, including the further steps of:
    preheating the edge of the nickel-aluminide to 500° C.; and
    maintaining the nickel-aluminide 3 mm from the edge at 500° C. during the GTAW process.

13. The method of claim 1, including the further steps of:
    heating the nickel-aluminide to 900° C.; and
    soaking the nickel-aluminide at 900° C. for 1 hour per inch (25.4 mm) thickness thereof.

* * * * *